Sept. 27, 1932.　　　L. DEL RICCIO　　　1,879,737
PROJECTION APPARATUS
Filed Dec. 22, 1928
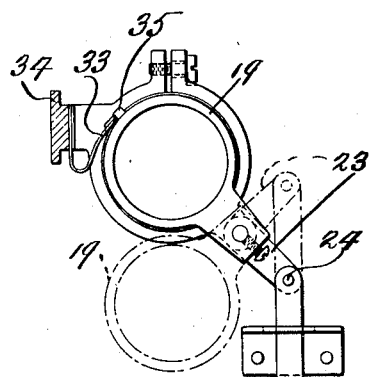
Fig.1.
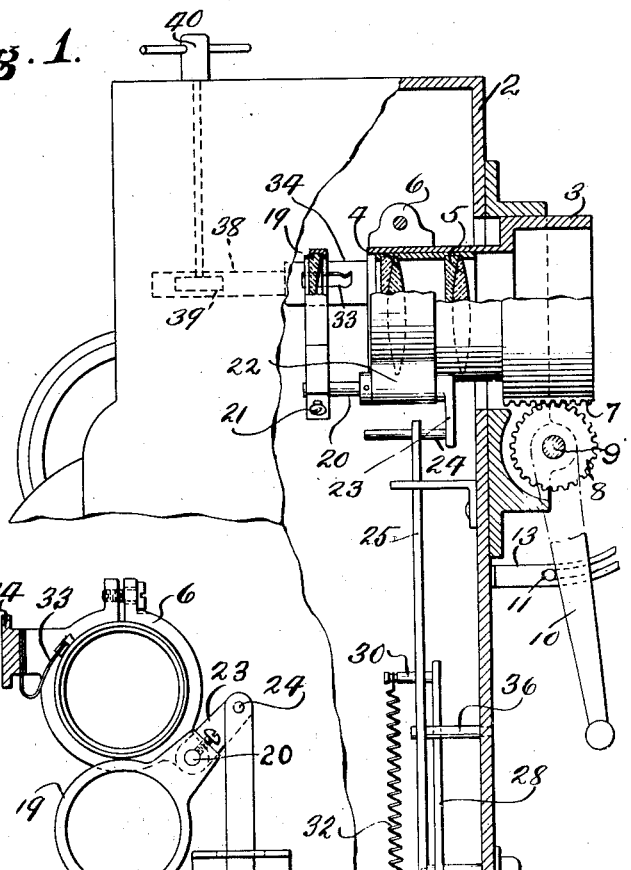
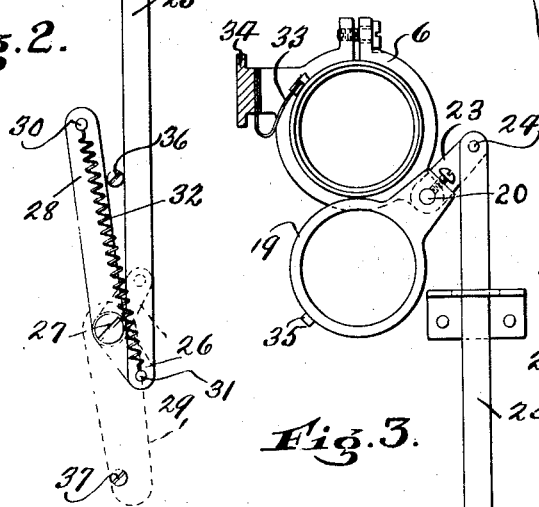
Fig.2.
Fig.3.
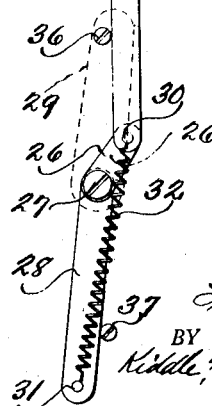
INVENTOR.
Lorenzo del Riccio
BY
Kiddle, Margedant and Horridge
ATTORNEYS.

Patented Sept. 27, 1932

1,879,737

UNITED STATES PATENT OFFICE

LORENZO DEL RICCIO, OF LOS ANGELES, CALIFORNIA, ASSIGNOR TO PARAMOUNT FAMOUS LASKY CORPORATION, AND WARNER BROS. PICTURES, INC., BOTH OF NEW YORK, N. Y., BOTH CORPORATIONS OF NEW YORK

PROJECTION APPARATUS

Application filed December 22, 1928. Serial No. 327,832.

This invention relates to an improvement in projecting machines primarily adapted for use in projecting pictures of different areas, and provides an apparatus so constructed and arranged as to require the minimum of skill in operation.

More specifically the apparatus of this invention provides the usual lens system or objective and an additional negative lens, means being provided whereby the negative lens may be moved into cooperative position relatively to the objective lens system when pictures of normal size are to be projected, and immediately removed when pictures of a larger size are to be projected, the simple operation required for moving the additional lens into and out of operative position focusing the objective lens system.

The improved apparatus of this invention is so exceedingly simple in its construction that the mere throwing of a lever or imparting a partial turn to a crank is all that is necessary when operating.

In the drawing, Fig. 1 shows in part sectional elevation a portion of a projecting machine with my invention applied thereto;

Fig. 2 is a view of the apparatus for moving the negative lens into and out of operative position, the lens in this figure being shown in operative position; and Fig. 3 is a view similar to Fig. 2 with the negative lens moved out of operative position.

Referring to the drawing in detail, and first of all to Figs. 1 and 2, 2 designates a front plate of a projection machine of usual construction. The mount 3 for the objective lens system is slidably mounted in the plate 2 and carries the objective lenses 4 and 5. 6 is the usual clamp for the mount 3.

One side of the mount 3 is provided with a rack 7 cooperating with a gear 8, the latter being mounted on a shaft 9 rotated by a handle or lever 10. Obviously movement of the handle 10 to the right or left, as the case may be, in Fig. 1 will cause reciprocation of the lens mount 3 and the objective lens system carried thereby. The possible movement of the operating handle 10 is, or may be, controlled by stops one of which is shown at 11, conveniently carried by a quadrant 13 secured, for instance, to the front plate 2 of the projection head.

19 designates a negative lens mounted on a short rod 20 to which it is rigidly clamped by a screw 21. This rod 20 is slidable in a bearing shown at 22 and likewise is rotatable in this bearing. The end of the rod 20 remote from the negative lens 19 carries an arm or crank 23, this arm or crank in turn being provided with a pin 24 lying parallel to the short rod 20 and offset therefrom the length of the crank 23. The pin 24 passes through and has a sliding movement relatively to a link 25 extending perpendicular to the pin 24, the lower end of this link being pivotally attached to the outer end of a short crank 26, the inner end of which is pivoted at 27.

The pin 27 carries also an arm 28 which is rigid with the crank 26 and both the crank 26 and arm 28 are adapted to be moved from the full line position of Fig. 2 to the dotted line position thereof by a handle 29.

The arm 28 carries a pin 30 and the crank 26 and the link 25 carries a pin 31. The spring 32 is stretched between and attached to these pins.

In operation and assuming that the parts are in the full line position of Fig. 2, which is the position also shown in Fig. 1, and that it is desired to move the negative lens 19 to the dotted line position of Fig. 2 at the same time moving the objective lenses 4 and 5 into position where they may be in focus so far as the projection screen is concerned.

With the lens 19 in operative position, that is, in line with the lenses 4 and 5, the handle 29 is moved to the position shown in Fig. 1 at which time the spring 32 is to one side of the pivot 27, that is, to that side adjacent the link 25. With the parts in this position the spring 32 is under tension and its tendency is to exert an upward effort on the link 25 with a consequent effort on the crank 23 attached to the rod 20 carrying the lens 19.

Movement, however, of the link 25 upwardly as viewed in Fig. 2 is at this time prevented by means of a spring catch 33 which is carried by a slide 34, one finger of this catch being at this time engaged by a small lug 35 on the periphery of the mount for the negative lens 19. In other words, the negative lens 19 is at this time latched in operative position.

The operator, however, in order to have the objective lens system in focus when the negative lens 19 is moved out of operative position is required to move the handle 10 to the right. In doing so the objective lens mount 3 is moved to the left as viewed in Fig. 1 and finally the forward end thereof will engage the spring finger 33 depressing the same out of the latching position with respect to the lug 35. This frees or unlatches the lens 19 and the link 25 will now snap upwardly under the action of the spring 32 to actuate the crank 23 and snap the lens 19 out of operative position, the lens then assuming the dotted line position of Fig. 2.

It might be mentioned that the movement of the crank 29 or proper setting of the crank 29 is governed by a pin 36 carried in the front wall of the projection head. The operator will then move the handle 29 one hundred eighty degrees (180°) in the reverse direction to bring the arm 28 and crank 26 to the position shown in Fig. 3 in full lines, this proper setting of the handle being regulated by a pin 37 also mounted conveniently in the front wall of the projection head, the handle 29 being moved until the arm 28 contacts with this pin and further movement is resisted.

With this setting the spring 32 will be off center so far as pivot 27 is concerned but is now exerting a pull on the link 25 downwardly as viewed in Fig. 3 in a direction to raise the negative lens 19 from the dotted line position of Fig. 2 to the full line position thereof. As will be observed, however, from Fig. 3 and as will be apparent from an inspection of Fig. 1, such movement of the link 25, that is, a downward movement thereof is prevented by the lens mounting 3, the frame of the negative lens 19 engaging at this time the outer surface of this mount.

Although the handle 29 has now been moved into position therefor to set the lens operating mechanism for lifting the lens into operative position, it will be apparent that the lens will remain in the full line position of Fig. 3. The operator then merely moves the handle 10 to the left as viewed in Fig. 1 to retract the lens mount 3 and after a slight movement of this mount, it will have disengaged the lens 19 and the latter will snap upwardly under the action of the spring 32 into operative position.

It will be seen, therefore, from the foregoing that the apparatus just described provides for snapping the negative lens 19 into and out of operative position.

It will be observed also that after the apparatus has once been set so far as focusing on the screen is concerned that the longitudinal movement of the lens mount 3 moves the objective lens system into proper position so far as focusing on the projection screen is concerned and at the same time imparts a similar movement to the lens 19.

I have provided, however, for more or less of a micrometer adjustment of the negative lens 19 which may take the form of a rack and pinion shown in broken lines on Fig. 1 at 38 and 39, the pinion being operated from the exterior of the projection head by a handle 40. The rack 38 is a part of, or may be a part of, the slide 34 and when operated will vary slightly the distance between the negative lens 19 and the objective lens system comprising the objective lenses 4 and 5, this movement being permitted by reason of the possible longitudinal movement of the rod 20 in its bearings in the lens mount 3.

It will be apparent from the foregoing that I have provided a projection apparatus wherein the area of the projected picture is changed with the minimum of effort and skill on the part of the operator, the apparatus after its initial setting being operable by the simple throwing of the crank 10 from one extreme position as determined by one of its adjustable stops to its other extreme position as determined by the other of its adjustable stops.

It is evident that various modifications may be made in the construction above described within the purview of this invention.

What I claim is:—

1. Projection apparatus comprising an objective lens system, a mount therefor, means for imparting longitudinal movement to said mount, an additional lens system adapted to be moved transversely of said objective lens system into and out of operative position relatively thereto, and means for imparting bodily movement to the additional lens system and said objective lens system when the additional lens system is in axial alignment with the objective lens system.

2. Projection apparatus comprising in combination an objective lens system, a mount therefor, means for imparting longitudinal movement to said mount, an additional lens system, spring-actuated mechanism for moving said additional lens system transversely of said mount and objective lens system into and out of operative position with respect to said objective lens system, setting mechanism for said spring-actuated mechanism, and stops for limiting the movement of said setting mechanism.

3. Projection apparatus comprising in combination an objective lens system, a mount therefor, means for sliding said mount longitudinally, an additional lens system, a rod mounting the same and having a bearing in said objective lens mount, a crank attached to said rod and a spring-actuated system of links and cranks operatively connected to said first-mentioned crank, one setting of said spring-actuated cranks and links effecting movement of the additional lens system into operative position relatively to the objective lens system, another setting of said spring-actuated crank and link system moving the additional lens out of operative position relatively to said additional lens system.

4. Projection apparatus comprising in combination an objective lens system, an auxiliary lens system movable into and out of operative position relatively to the objective lens system, means comprising a spring for effecting such movement of the auxiliary lens system, means for placing said spring under tension, latching mechanism for holding the auxiliary lens system against the tension of said spring, and means for moving said objective lens system, said movement of the objective lens system releasing said latching mechanism.

5. Projection apparatus comprising in combination an objective lens system, an auxiliary lens system movable into and out of operative position relatively to the objective lens system, mechanism comprising a spring for snapping said auxiliary lens system into and out of operative position relatively to the objective lens system, means for placing said spring under tension, latching mechanism for latching the auxiliary lens system against the tension of said spring, and means for moving the objective lens system to focus on a projection surface, said movement of the objective lens system releasing said latching mechanism.

6. Projection apparatus comprising in combination an objective lens system, an auxiliary lens system, a mount carrying said objective lens system, a pivotal mount for the auxiliary lens system, mechanism including a spring for pivoting said auxiliary lens system into and out of operative position with respect to the objective lens system, means for placing said spring under tension, latching mechanism for latching the auxiliary lens system against the tension of said spring, and means for moving said objective and its mount axially, such movement releasing said latching mechanism.

7. Projection apparatus comprising in combination an objective lens system, an auxiliary lens system movable into and out of operative position relatively to the objective lens system, mechanism including a spring for effecting such movement of the additional lens system, manually operative means for placing said spring under tension, latching mechanism for holding the auxiliary lens system against the tension of said spring, and means for moving the objective lens system to release said latching mechanism.

8. Projection apparatus comprising in combination an objective lens system, a longitudinally movable mount therefor, an auxiliary lens system adapted to be moved into and out of operative position, manually operable means for moving said objective lens system first in one direction and then in the opposite direction, means including a spring for moving the auxiliary lens system on one direction of movement of the objective lens system out of operative position with respect to the same and on the opposite movement of the objective lens system to move the auxiliary lens system into operative position relatively thereto, means for placing said spring under tension, latching mechanism for latching the auxiliary lens system against the tension of said spring, and said latching mechanism being released by the movement of the objective lens system.

This specification signed this 21st day of December, 1928.

LORENZO DEL RICCIO.

CERTIFICATE OF CORRECTION.

Patent No. 1,879,737.　　　　　　　　　　　　　　September 27, 1932.

LORENZO DEL RICCIO.

It is hereby certified that the first mentioned assignee in the above numbered patent was erroneously described and specified as "Paramount Famous Lasky Corporation" whereas said assignee should have been described and specified as "Paramount Publix Corporation", as shown by the records of assignments in this office; and that the said Letters Patent should be read with this correction therein that the same may conform to the record of the case in the Patent Office.

Signed and sealed this 27th day of December A. D. 1932.

(Seal)

M. J. Moore,
Acting Commissioner of Patents.